(12) United States Patent
Hamada et al.

(10) Patent No.: US 12,528,976 B2
(45) Date of Patent: Jan. 20, 2026

(54) WATER-DISPERSED PRESSURE-SENSITIVE ADHESIVE COMPOSITION AND PRESSURE-SENSITIVE ADHESIVE SHEET

(71) Applicant: NITTO DENKO CORPORATION, Ibaraki (JP)

(72) Inventors: Hiroyuki Hamada, Ibaraki (JP); Toshihide Suzuki, Ibaraki (JP); Hyunhee Shim, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 216 days.

(21) Appl. No.: 17/298,320

(22) PCT Filed: Nov. 12, 2019

(86) PCT No.: PCT/JP2019/044211
§ 371 (c)(1),
(2) Date: May 28, 2021

(87) PCT Pub. No.: WO2020/116098
PCT Pub. Date: Jun. 11, 2020

(65) Prior Publication Data
US 2022/0025222 A1    Jan. 27, 2022

(30) Foreign Application Priority Data

Dec. 6, 2018 (JP) .................... 2018-228982

(51) Int. Cl.
*C09J 7/38* (2018.01)
*C09J 7/21* (2018.01)

(52) U.S. Cl.
CPC ............. *C09J 7/385* (2018.01); *C09J 7/21* (2018.01); *C09J 2301/124* (2020.08); *C09J 2301/302* (2020.08); *C09J 2433/00* (2013.01)

(58) Field of Classification Search
CPC ........ C09J 7/21; C09J 7/38; C09J 7/385; C09J 2433/00; C09J 133/08; C09J 11/08;
(Continued)

(56) References Cited

U.S. PATENT DOCUMENTS 5,371,136 A * 12/1994 Brooks ................ C09J 121/02
524/270
5,512,612 A    4/1996 Brown et al.
(Continued)

FOREIGN PATENT DOCUMENTS

CN    1145087 A    3/1997
CN    102134466 A    7/2011
(Continued)

OTHER PUBLICATIONS

Rompp Chemie Lexikon, Georg Thieme Verlag, Stuttgart, New York, 1995, 9th Edition, vol. 5, XP002118696, pp. 3506, 3508 & 3542 (3 pages total).
(Continued)

*Primary Examiner* — Jennifer A Gillett
(74) *Attorney, Agent, or Firm* — Sughrue Mion, PLLC

(57) ABSTRACT

Provided is a water-dispersed PSA composition capable of bringing about greater water resistance. The water-dispersed PSA composition provided by this invention comprises an acrylic polymer as base polymer, a water-dispersed tackifier resin, and a polyacrylic acid. The polyacrylic acid has a number average molecular weight of 2000 to $550 \times 10^4$. The polyacrylic acid content is 0.3 part by weight or higher and 7 parts by weight or lower to 100 parts by weight of the base polymer.

7 Claims, 1 Drawing Sheet

(58) Field of Classification Search
CPC .......... C08F 220/1804; C08F 220/1808; C08F 220/14; C08F 220/06; C08F 230/085; C08L 33/02
See application file for complete search history.

(56) References Cited

U.S. PATENT DOCUMENTS

| | | | |
|---|---|---|---|
| 6,242,512 B1 | 6/2001 | Figge et al. | |
| 2003/0100670 A1* | 5/2003 | Chen ................. | C08F 220/1808 524/601 |
| 2003/0162886 A1 | 8/2003 | Tosaki et al. | |
| 2005/0075444 A1 | 4/2005 | Tosaki et al. | |
| 2006/0024494 A1* | 2/2006 | Amano ................... | C09J 11/06 428/522 |
| 2009/0095517 A1* | 4/2009 | Nonaka .................... | C09J 11/08 174/259 |
| 2013/0323498 A1* | 12/2013 | Takahashi ................ | C09J 11/06 524/272 |
| 2016/0289516 A1* | 10/2016 | Makihata ................ | B32B 27/06 |

FOREIGN PATENT DOCUMENTS

| | | |
|---|---|---|
| CN | 107022329 A | 8/2017 |
| EP | 1 340 797 A2 | 9/2003 |
| JP | 3-64305 A | 3/1991 |
| JP | 09-511538 A | 11/1997 |
| JP | 11-503790 A | 3/1999 |
| JP | 2001-503087 A | 3/2001 |
| JP | 2003-313525 A | 11/2003 |
| JP | 2013-036011 A | 2/2013 |
| JP | 2017061587 A * | 3/2017 .......... B32B 37/003 |
| JP | 2017-132993 A | 8/2017 |
| KR | 10-0275289 B1 | 12/2000 |
| WO | 95/27016 A1 | 10/1995 |
| WO | 98/16591 A1 | 4/1998 |
| WO | 2006/104235 A1 | 10/2006 |

OTHER PUBLICATIONS

Extended European Search Report dated Jul. 12, 2022 in Application No. 19892553.9.
First Office Action issued Oct. 11, 2022 in Chinese Application No. 201980080393.2.
Notice of Reasons for Refusal issued Oct. 27, 2022 in Japanese Application No. 2018-228982.
International Search Report for PCT/JP2019/044211, dated Feb. 4, 2020.
Request for the Submission of an Opinion issued Mar. 27, 2024 in Application No. 10-2021-7020600.
Notice of Final Rejection dated Nov. 26, 2024 in Korean Application No. 10-2021-7020600.
Ulrike Wenzel, "Characterization of an ultra-high molecular weight polymethacrylate with a liquid crystalline side group in dilute solution", Technical University of Berlin, Jul. 5, 2000 (12 pages).
Communication dated Jan. 14, 2025 in European Application No. 19 892 553.9.
Communication dated Aug. 25, 2025, issued in EP application No. 19892553.9.
Adam Bivens, "Polymer-to-Solvent Reference Table for GPC/SEC", Agilent Technologies, Mar. 24, 2016, pp. 1-10.

* cited by examiner

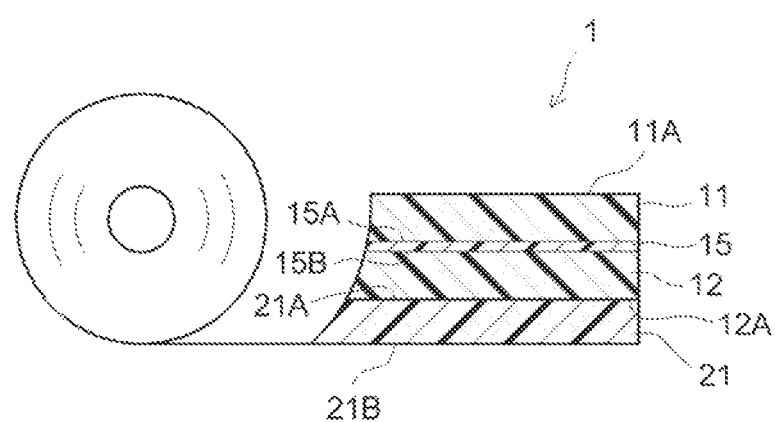

WATER-DISPERSED PRESSURE-SENSITIVE ADHESIVE COMPOSITION AND PRESSURE-SENSITIVE ADHESIVE SHEET

TECHNICAL FIELD

The present invention relates to a water-dispersed pressure-sensitive adhesive (PSA) composition and a PSA sheet formed using the water-dispersed PSA composition.

The present application is a National Stage of International Application No. PCT/JP2019/044211 filed Nov. 12, 2019, claiming priority to Japanese Patent Application No. 2018-228982 filed on Dec. 6, 2018 and the entire content thereof is herein incorporated by reference.

BACKGROUND ART

From the standpoint of environmental health, water-dispersed PSA compositions of PSA ingredients dispersed in aqueous media (emulsion PSA compositions comprising PSA ingredients dispersed in aqueous media) are preferable to PSA compositions of PSA ingredients dissolved in organic solvents (solvent-based PSA compositions). Accordingly, PSA sheets produced using water-dispersed PSA compositions, whether as double-sided tape or in some other form, are used in various fields. Patent Document 1 is a technical literature related to water-dispersed PSA compositions.

CITATION LIST

Patent Literature

[Patent Document 1] Japanese Patent Application Publication No. 2017-132993

SUMMARY OF INVENTION

Technical Problem

To increase peel strength, etc., tackifier resin can be added to PSA compositions. The tackifier resin is generally water-insoluble; and therefore, in a water-dispersed PSA composition, it is often used as a tackifier resin emulsion (water-dispersed tackifier resin) wherein the tackifier resin is dispersed in water. However, when a water-dispersed PSA composition includes a tackifier resin emulsion, the PSA layers formed therefrom tend to have lower water resistance (e.g. a decrease in retained peel strength when stored under wet-hot conditions).

The present invention has been made in view of such circumstances with an objective to provide a water-dispersed PSA composition capable of forming a PSA layer with improved water resistance. Another related objective is to provide a PSA sheet comprising a PSA layer formed from the water-dispersed PSA composition.

Solution to Problem

The present inventors have found that, in a water-dispersed PSA composition using an acrylic polymer as base polymer and comprising a water-dispersed tackifier resin, when a polyacrylic acid having a certain number average molecular weight is added in a certain amount relative to the base polymer, PSA layers formed from the PSA composition have significantly greater water resistance, whereby the present invention has been completed.

This Description provides a water-dispersed PSA composition comprising an acrylic polymer as the base polymer, a water-dispersed tackifier resin, and a polyacrylic acid. Here, the polyacrylic acid has a number average molecular weight (Mn) of 2000 to 5500000. The polyacrylic acid content is 0.3 part by weight or higher and 7 parts by weight or lower to 100 parts by weight of the base polymer.

As described above, in a water-dispersed PSA composition using an acrylic polymer as the base polymer and comprising a water-dispersed tackifier resin, when at least 0.3 part by weight of polyacrylic acid with Mn≥2000 is included per 100 parts by weight of the base polymer, the PSA layers formed therefrom can have significantly improved water resistance. When a water-dispersed PSA composition has excessively high viscosity because of harder application, etc., it may be difficult to form PSA layers having good surface conditions. When the polyacrylic acid content is 7 parts by weight or less with Mn≤5500000, an excessive increase in viscosity is avoided, making it easier to form a PSA layer with good surface conditions. It is preferable that the PSA layer has good surface conditions because it may help enhance adhesive properties through increased tightness of adhesion to adherends.

The acrylic polymer is preferably a polymerization product (typically an emulsion polymerization product) of a starting monomer mixture comprising more than 50% alkyl (meth)acrylate by weight. With a water-dispersed acrylic PSA composition comprising such an acrylic polymer as the base polymer, the resulting PSA layer is likely to show good adhesive properties.

The water-dispersed PSA composition preferably comprises a surfactant. In the water dispersed PSA composition according to a preferable embodiment, the surfactant comprises a reactive surfactant. When a reactive surfactant is used, the resulting PSA layer tends to show higher water resistance.

The water-dispersed tackifier resin content can be, for instance, 1 part by weight or higher and 70 parts by weight or lower to 100 parts by weight of the base polymer. According to a water-dispersed PSA composition having such a composition, the resulting PSA layer tends to favorably combine good water resistance and adhesive properties.

In another preferable embodiment of the art disclosed herein, the PSA composition comprises a tackifier resin having a softening point (Ts) of 90° C. or higher as the water-dispersed tackifier resin. It may be advantageous to use a species having a high Ts as the tackifier resin in view of the PSA's cohesion. According to an embodiment comprising a high-Ts tackifier resin, the resulting PSA layer tends to have excellent adhesive properties.

The present invention also provides a PSA sheet comprising a PSA layer formed from a water-dispersed PSA composition disclosed herein. Such a PSA sheet may show good water resistance with the PSA layer formed from the water-dispersed PSA composition.

The PSA sheet according to a preferable embodiment has a 180° peel strength of 4 N/20 mm or greater after applied to a stainless steel plate and stored at 60° C. and 95% RH for 24 hours (or "after wet-heated"). The PSA sheet showing such peel strength after wet-heated is preferably used as a highly water-resistant PSA sheet.

In the PSA sheet according to another preferable embodiment, the 180° peel strength after applied to a stainless steel plate and stored at 60° C. and 95% RH for 24 hours is at least 0.5 times the 180° peel strength after applied to a stainless steel plate and stored at 23° C. and 50% RH for 30 minutes.

The PSA sheet showing such a high peel strength retention rate when wet-heated is preferably used as a highly water-resistant PSA sheet.

The PSA sheet according to a preferable embodiment is formed as an adhesively double-faced PSA sheet that comprises a substrate and, as the PSA layer, a first PSA layer placed on one face of the substrate and a second PSA layer placed on the other face of the substrate. The double-faced PSA sheet in this embodiment is preferably used for joining various articles and parts. The PSA sheet disclosed herein can be preferably made in an embodiment wherein the substrate is a non-woven fabric.

This Description also provides a method for producing a PSA sheet. The production method comprises a step of mixing an acrylic polymer as a base polymer, a water-dispersed tackifier resin and polyacrylic acid to obtain a water-dispersed PSA composition; and a step of forming a PSA layer from the water-dispersed PSA composition. Here, as the polyacrylic acid, a species having a Mn of 2000 to 5500000 is used. The polyacrylic acid is used in an amount of 0.3 part by weight or greater and 7 parts by weight or less per 100 parts by weight of the base polymer. The production method provides a PSA sheet with increased water resistance.

BRIEF DESCRIPTION OF DRAWINGS

FIG. 1 shows a schematic cross-sectional view illustrating a configuration of the PSA sheet according to an embodiment.

DESCRIPTION OF EMBODIMENTS

Preferred embodiments of the present invention are described below. Matters necessary to practice this invention other than those specifically referred to in this description can be understood by a person skilled in the art based on the disclosure about implementing the invention in this description and common general knowledge at the time of application. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate size or reduction scale of an actual product provided.

The term "PSA" in this description refers to a material present in a soft solid (viscoelastic) state in a room temperature range and has a property to adhere to adherend with some pressure applied. As defined in "Adhesion Fundamental and Practice" by C. A. Dahlquist (McLaren & Sons (1966), P, 143), the PSA referred to herein can be a material having a property that satisfies complex tensile modulus $E^*(1\ Hz) < 10^7$ dyne/cm$^2$ (typically, a material exhibiting the described characteristics at 25° C.). The PSA in the art disclosed herein can be considered as solid contents (non-volatiles) in a PSA composition or constituents of a PSA layer.

As used herein, the term "(meth)acryloyl" comprehensively refers to acryloyl and methacryloyl. Similarly the term "(meth)acrylate" comprehensively refers to acrylate and methacrylate, and the term "(meth)acryl" comprehensively refers to acryl and methacryl.

The term "acrylic polymer" in this description refers to a polymer comprising, as a monomeric unit constituting the polymer, more than 50% by weight of a monomeric unit derived from an acrylic monomer. The acrylic monomer refers to a monomer derived from a monomer having at least one (meth)acryloyl group per molecule.

The term "water-dispersed" in the present description refers to a state where components are at least partially dispersed in water. For instance, the term "water-dispersed PSA composition" refers to a composition comprising a PSA composition and water while being in a state where the PSA composition is at least partially dispersed in water. The water-dispersed state also includes a suspended state and an emulsified state.

<Water-Dispersed PSA Composition>

The PSA composition disclosed herein is a water-dispersed (typically aqueous emulsion-based) PSA composition including an adhesive ingredient dispersed in an aqueous medium. As used herein, the "aqueous medium" refers to a medium wherein the solvent making up the medium is water or a solvent mixture (aqueous solvent) comprising water as the primary component.

(Acrylic Polymer)

The PSA composition disclosed herein is an acrylic PSA composition comprising an acrylic polymer as a base polymer. Herein, the term "base polymer" refers to the primary component among polymers in the PSA composition (which can be a PSA). In this description, the term "primary component" refers to a component that accounts for more than 50% by weight unless otherwise specified. In a preferable embodiment, the acrylic PSA composition is an emulsion acrylic PSA composition comprising a water-dispersed acrylic polymer. The water-dispersed acrylic polymer has an emulsion form where the acrylic polymer is dispersed in water. As for the acrylic polymer, it is preferable to use a polymer formed from an alkyl (meth)acrylate as the primary monomer (i.e. a component accounting for higher than 50% by weight of the total amount of the monomers constituting the acrylic polymer).

As the acrylic polymer, for example, a polymer of a monomeric starting material (monomers) comprising an alkyl (meth)acrylate as the primary monomer and possibly comprising a secondary monomer copolymerizable with the primary monomer is preferable. The primary monomer herein refers to a component that accounts for higher than 50% by weight of the monomer composition in the monomeric starting material.

As the alkyl (meth)acrylate, for instance, a compound represented by the following formula (1) can be preferably used:

$$CH_2=C(R^1)COOR^2 \quad (1)$$

Herein, $R^1$ in the formula (1) is a hydrogen atom or a methyl group. $R^2$ is a linear alkyl group having 1 to 20 carbon atoms (hereinafter, such a range of the number of carbon atoms may be indicated as "$C_{1-20}$"). From the standpoint of the storage elastic modulus of PSA, an alkyl (meth)acrylate with $R^2$ being a $C_{1-14}$ linear alkyl group is preferable, an alkyl (meth)acrylate with $R^2$ being a $C_{1-10}$ linear alkyl group is more preferable, and an alkyl (meth) acrylate with $R^2$ being a butyl group or a 2-ethylhexyl group is particularly preferable.

Examples of an alkyl (meth)acrylate with $R^2$ being a $C_{1-20}$ linear alkyl group include methyl (meth)acrylate, ethyl (meth)acrylate, propyl (meth)acrylate, isopropyl (meth) acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. Among these alkyl (meth)acrylates, can be used one species solely or a combination of two or more species. Preferable alkyl (meth)acrylates include n-butyl acrylate (BA) and 2-ethylhexyl acrylate (2EHA).

The art disclosed herein can be preferably implemented in an embodiment where the monomers comprise an alkyl (meth)acrylate wherein $R^2$ in the formula (1) is a $C_{4-10}$ acyclic alkyl group (typically at least either BA or 2EHA) and the total amount of the alkyl (meth)acrylate having the $C_{4-10}$ acyclic alkyl group for $R^2$ in the formula (1) (typically the total amount of BA and 2EHA) accounts for 70% by weight or more (typically 80% by weight or more) of the alkyl (meth)acrylate(s) in the monomers.

When the alkyl (meth)acrylate comprises an alkyl (meth)acrylate having an acyclic $C_{4-10}$ alkyl group as $R^2$ in the formula (1) (typically at least either BA or 2EHA), the total amount of the other alkyl (meth)acrylate(s) (alkyl (meth)acrylate(s) having an acyclic $C_{<4}$ or $C_{>10}$ alkyl group (alkyl group with fewer than four carbon atoms or more than ten carbon atoms) as $R^2$ in the formula (1)) is preferably about 30% by weight or less (e.g. 20% by weight or less, typically 15% by weight or less) of the monomers constituting the acrylic polymer. From the standpoint of obtaining the effects of the other alkyl (meth)acrylate(s), their total amount is preferably about 1% by weight or more (e.g. 5% by weight or more, typically 10% by weight or more) of the monomers. As the other alkyl (meth)acrylate, an alkyl (meth)acrylate having an acyclic $C_{1-3}$ alkyl group as $R^2$ in the formula (1) can be preferably used. Specific examples thereof include methyl acrylate (MA), methyl methacrylate (MIA) and ethyl acrylate (EA). Among them. MA is more preferable.

The secondary monomer copolymerizable with the alkyl (meth)acrylate being the primary monomer may be useful for introducing crosslinking points in the acrylic polymer or increasing the cohesive strength of the acrylic polymer. As the secondary monomer, for instance, the following functional group-containing monomers can be used one species solely or a combination of two or more species:

Carboxy group-containing monomers: for example, ethylenic unsaturated mono-carboxylic acids such as acrylic acid (AA), methacrylic acid (MAA), crotonic acid, etc.; ethylenic unsaturated dicarboxylic acids such as maleic acid, itaconic acid, citraconic acid, etc., as well as anhydrides thereof (maleic acid anhydride, itaconic acid anhydride, etc.).

Hydroxy group-containing monomers: for example, hydroxyalkyl (meth)acrylates such as 2-hydroxyethyl (meth)acrylate, 2-hydroxypropyl (meth)acrylate, 3-hydroxypropyl (meth)acrylate, 4-hydroxybutyl (meth)acrylate, etc.; unsaturated alcohols such as vinyl alcohol, allyl alcohol, etc.

Amide group-containing monomers: for example, (meth)acrylamide, N,N-dimethyl(meth)acrylamide, N-butyl(meth)acrylamide, N-methylol(meth)acrylamide, N-methylolpropane(meth)acrylamide, N-methoxymethyl(meth)acrylamide. N-butoxymethyl(meth)acrylamide.

Amino group-containing monomers: for example, aminoethyl (meth)acrylate, N,N-dimethylaminoethyl (meth)acrylate, t-butylaminoethyl (meth)acrylate.

Epoxy group-containing monomers: for example, glycidyl (meth)acrylate, methylglycidyl (meth)acrylate, allyl glycidyl ether.

Cyano group-containing monomers: for example, acrylonitrile, methacrylonitrile.

Keto group-containing monomers: for example, diacetone (meth)acrylamide, diacetone (meth)acrylate, vinyl methyl ketone, vinyl ethyl ketone, allyl acetoacetate, vinyl acetoacetate.

Monomers having nitrogen atom-containing rings: for example, N-vinyl-2-pyrrolidone. N-methylvinylpyrrolidone. N-vinylpyridine, N-vinylpiperidone, N-vinylpyrimidine. N-vinylpiperazine, N-vinylpyrazine. N-vinylpyrrole, N-vinylimidazole. N-vinyloxazole, N-vinylmorpholine. N-vinylcaprolactam, N-(meth)acryloyl morpholine.

Alkoxysilyl group-containing monomers: for example, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane.

The functional group-containing monomers can be used singly as one species or in a combination of two or more species. Among the functional group-containing monomers, for the abilities to preferably bring about introduction of crosslinking points as described above and an increase in cohesive strength, carboxy group-containing monomers and hydroxy group-containing monomers are preferable, with carboxy group-containing monomers being more preferable. Among carboxy group-containing monomers, AA and MAA are preferable.

In a preferable embodiment, as the functional group-containing monomer, AA and MAA are used together. The PSA composition comprising an acrylic polymer having such a monomer composition (i.e. copolymer composition) may produce a PSA sheet of higher performance (e.g. with greater repulsion resistance). The weight ratio of AA to MAA (AA/MAA) can be, for instance, in a range of 0.1 to 10. It is more preferably about 0.3 or higher (typically 0.5 or higher). It is more preferably about 4 or lower (typically 3 or lower). When AA/MAA is within these ranges, a sufficient effect to increase the repulsion resistance tends to be likely obtained and also after the PSA sheet is fabricated, it tends to have excellent temporal stability with respect to the adhesive properties.

In the acrylic polymer, an alkoxysilyl group-containing monomer is preferably copolymerized. The alkoxysilyl group-containing monomer is an ethylenic unsaturated monomer having at least one (preferably two or more, e.g. two or three) alkoxysilyl group per molecule. Specific examples thereof are as mentioned earlier. For the alkoxysilyl group-containing monomer, solely one species or a combination of two or more species can be used. By copolymerizing the alkoxysilyl group-containing monomer, upon the condensation reaction of the silanol group (silanol condensation), a crosslinked structure can be introduced in the PSA formed from the PSA composition comprising the acrylic polymer.

When a functional group-containing monomer is copolymerized in the acrylic polymer, the ratio of functional group-containing monomer to all monomers constituting the acrylic polymer is not particularly limited. Usually, from the standpoint of combining cohesive strength and adhesiveness at a good balance, the ratio of functional group-containing monomer is preferably about 0.1 by weight or higher (e.g. 0.5% by weight or higher, typically 1% by weight or higher). In view of the effect of the alkyl (meth)acrylate on the adhesion, the ratio is preferably about 40% by weight or lower (e.g. 30% by weight or lower, typically 20% by weight or lower).

When a carboxy group-containing monomer is copolymerized in the acrylic polymer, the ratio of carboxy group-containing monomers to all monomers is suitably 15% by weight or lower from the standpoint of increasing the water resistance. It can be, for instance, 10% by weight or lower, 5% by weight or lower, or even 3% by weight or lower. On the other hand, from the standpoint of the cohesion, etc., in some embodiments, it can be, for instance, 0.1% by weight or higher, or even 0.5% by weight or higher. The art disclosed herein can bring about good water resistance even in an embodiment where the ratio of carboxyl group-containing monomers to all monomers is 1% by weight or higher, or an embodiment where it is 1.5% by weight or higher.

When an alkoxysilyl group-containing monomer is copolymerized in the acrylic polymer, the ratio of alkoxysilyl group-containing monomers is suitably 0.005% by weight or higher (e.g. 0.01% by weight or higher) of all the monomers. This ratio is suitably about 0.1% by weight or lower (e.g. 0.03% by weight or lower).

For the purpose of increasing the cohesive strength of the acrylic polymer, etc., other co-monomer(s) besides the aforementioned secondary monomers can be used. Examples of such co-monomers include vinyl ester-based monomers such as vinyl acetate, vinyl propionate, etc.; aromatic vinyl compounds such as styrene, substituted styrenes (α-methylstyrene, etc.), vinyl toluene, etc.; cycloalkyl (meth)acrylates such as cyclohexyl (meth)acrylate, cyclopentyl (meth)acrylate, isobornyl (meth)acrylate, etc.; aromatic ring-containing (meth)acrylates such as aryl (meth)acrylate (e.g. phenyl (meth)acrylate), aryloxyalkyl (meth)acrylate (e.g. phenoxyethyl (meth)acrylate), arylalkyl (meth)acrylate (e.g. benzyl (meth)acrylate), etc.; olefinic monomers such as ethylene, propylene, isoprene, butadiene, isobutylene, etc.; chlorine-containing monomers such as vinyl chloride, vinylidene chloride, etc.: isocyanate group-containing monomers such as 2-(meth)acryloyloxyethyl isocyanate, etc.; alkoxy group-containing monomers such as methoxyethyl (meth)acrylate, ethoxyethyl (meth)acrylate, etc.; vinyl ether-based monomers such as methyl vinyl ether, ethyl vinyl ether, etc.; and the like.

Other examples of the other co-monomers excluding the secondary monomer include monomers having a plurality of functional groups in a molecule. Illustrative examples of such polyfunctional monomers include 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, (poly)ethylene glycol di(meth)acrylate, propylene glycol di(meth)acrylate, (poly)propylene glycol di(meth)acrylate, neopentylglycol di(meth)acrylate, pentaerythritol di(meth)acrylate, trimethylolpropane tri(meth)acrylate, pentaerythritol tri(meth)acrylate, dipentaerythritol hexa(meth)acrylate, glycerol di(meth)acrylate, epoxy acrylate, polyester acrylate, urethane acrylate, divinylbenzene, butyl di(meth)acrylate and hexyl di(meth)acrylate.

The amount of the other co-monomer(s) excluding the secondary monomer can be suitably selected according to the purpose and intended use, and thus is not particularly limited. For instance, it is preferable to be 10% by weight or less of the monomer composition of the acrylic polymer.

The acrylic polymer in the art disclosed herein is suitably designed to have a glass transition temperature (Tg) of −25° C. or below (typically −75° C. or above, but −25° C. or below). The acrylic polymer's Tg can be preferably −40° C. or below (e.g. −70° C. or above, but −40° C. or below) or more preferably −50° C. or below (typically −70° C. or above, but −50° C. or below). It is preferable that the acrylic polymer's Tg is at or below the upper limits from the standpoint of increasing the adhesive strength. The Tg of the acrylic polymer can be adjusted by the types and relative amounts of monomers used for synthesis of the polymer.

Herein, the Tg of an acrylic polymer refers to the value determined by the Fox equation based on the composition of the monomers. As shown below, the Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation, Tg represents the glass transition temperature (unit: K) of the copolymer. Wi represents the weight fraction (copolymerization ratio by weight) of a monomer i in the copolymer, and Tgi represents the glass transition temperature (unit: K) of homopolymer of the monomer i.

As the glass transition temperatures of homopolymers used for determining the Tg value, values found in publicly known documents are used. For example, with respect to the monomers listed below, as the glass transition temperatures of homopolymers of the monomers, the following values are used:

| | |
|---|---|
| 2-ethylhexyl acrylate | −70° C. |
| n-butyl acrylate | −55° C. |
| methyl methacrylate | 105° C. |
| methyl acrylate | 8° C. |
| vinyl acetate | 32° C. |
| acrylic acid | 106° C. |
| methacrylic acid | 228° C. |

With respect to the glass transition temperatures of homopolymers of monomers other than those listed above, values given in "*Polymer Handbook*" (3rd edition, John Wiley & Sons, Inc., Year 1989) are used. When the literature provides two or more values, the highest value is used.

With respect to monomers for whose homopolymers no glass transitions temperatures are given in *Polymer Handbook*, either, values obtained by the following measurement method are used (see Japanese Patent Application Publication No. 2007-51271). In particular, to a reaction vessel equipped with a thermometer, a stirrer, a nitrogen inlet and a condenser, are added 100 parts by weight of monomer, 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature, and a homopolymer solution having 33% by mass solids content is obtained. Then, this homopolymer solution is applied onto a release liner by flow coating and allowed to dry to prepare a test sample (a sheet of homopolymer) of about 2 mm thickness. This test sample is cut out into a disc of 7.9 mm diameter and is placed between parallel plates; and while applying a shear strain at a frequency of 1 Hz using a rheometer (ARES, available from Rheometrics Scientific. Inc.), the viscoelasticity is measured in the shear mode over a temperature range of −70° C. to 150° C. at a heating rate of 5° C./min; and the temperature value at the maximum of the tan δ curve is taken as the Tg of the homopolymer.

The method for obtaining the acrylic polymer is not particularly limited. Various polymerization methods known as synthetic means for acrylic polymers can be suitably employed, such as a solution polymerization method, emulsion polymerization method, bulk polymerization method, suspension polymerization method, photopolymerization method, etc. As for preferable polymerization methods, the emulsion polymerization method is cited. The embodiment of emulsion polymerization is not particularly limited. Various monomer supply methods, polymerization conditions, materials and the like similar to those for heretofore known general emulsion polymerization can be suitably used to carry out polymerization. Examples of suitable monomer supply methods include an all-at-once supply method where all starting monomers are supplied at once, continuous (dropwise) supply method, portionwise (dropwise) supply method, etc. Starting monomers can be added dropwise as an aqueous emulsion. The polymerization temperature can be about 20° C. or higher (usually 40° C. or higher) while it is suitably about 100° C. or lower (usually 80° C. or lower).

According to the emulsion polymerization, a polymerization mixture can be prepared as an emulsion of acrylic polymer dispersed in water (acrylic polymer emulsion). The water-dispersed PSA composition disclosed herein may be preferably produced using the polymerization mixture or such a polymerization mixture upon suitable work-up. Alternatively, an acrylic polymer emulsion may be prepared by a polymerization method other than emulsion polymerization (e.g. solution polymerization, photopolymerization, bulk polymerization, etc.) to synthesize an acrylic polymer, then dispersing the polymer in water.

The initiator used for the polymerization can be suitably selected in accordance with the type of polymerization method among heretofore known polymerization initiators. Examples include, but not limited to, azo-based initiators such as 2,2'-azobisisobutyronitrile, 2,2'-azobis(2-methylpropionamidine) disulfate salt, 2,2'-azobis(2-methylpropionamidine) dihydrochloride salt, 2,2'-azobis(2-amidinopropane) dihydrochloride salt, 2,2'-azobis[N-(2-carboxyethyl)-2-methylpropionamidine] hydrate, 2,2'-azobis(N,N'-dimethylene isobutylamidine), 2,2'-azobis[2-(2-imidazolin-2-yl)propane] dihydrochloride salt, etc.: persulfate salt-based initiators such as potassium persulfate, ammonium persulfate, etc.; peroxide-based initiators such as benzoyl peroxide, t-butyl hydroperoxide, hydrogen peroxide, etc.; substituted ethane-based initiators such as phenyl-substituted ethane, etc.; carbonyl-based initiators such as aromatic carbonyl compounds, etc.; redox-based initiators such as a combination of a persulfate salt and sodium hydrogen sulfite, a combination of a peroxide and sodium ascorbate, etc.; and so on. These polymerization initiators can be used singly as one species or in a combination of two or more species.

The polymerization initiator can be used in a usual amount and is not particularly limited. For instance, it can be selected from a range of about 0.005 by weight or above (preferably 0.01 part by weight or above) and of 1 part by weight or below (preferably 0.8 part by weight or below) relative to 100 parts by weight of all monomers.

In the polymerization, a chain transfer agent (which may also be thought as a molecular weight modifier or a regulator of polymerization degree) may be used as necessary. Examples of the chain transfer agent include mercaptans such as dodecyl mercaptan (dodecanethiol), lauryl mercaptan, glycidyl mercaptan, 2-mercaptoethanol, mercaptoacetic acid, 2-ethylhexyl thioglycolate and 2,3-dimethylcapto-1-propanol; α-methyl styrene dimer; and the like. Such chain transfer agents may be used singly or as a combination of two or more species.

To 100 parts by weight of the monomers, the chain transfer agent can be used in an amount of about 0.001 part by weight or greater (typically about 0.005 part by weight or greater), and, for instance, about 5 parts by weight or less (typically about 2 parts by weight or less, e.g. about 1 part by weight or less). By using a suitable amount of the chain transfer agent, a desirable conversion to polymer can be obtained.

Emulsion polymerization of the starting monomers is typically carried out in the presence of a surfactant (emulsifier). The amount of surfactant used is not particularly limited. In view of the polymerization stability and dispersion stability of the polymerization reactants, the amount of surfactant used is typically suitably 0.1 part by weight or greater, or preferably 0.5 part by weight or greater relative to 100 parts by weight of the starting monomers. From the standpoint of obtaining higher stability it can be 1.0 part by weight or greater, or even 1.5 parts by weight or greater. The surfactant can be used in an amount of, for instance, 10 parts by weight or less relative to 100 parts by weight of the starting monomers. On the other hand, from the standpoint of increasing the water resistance, it is desirable to reduce the usage of surfactant (especially non-reactive surfactant). From such a standpoint, the amount of surfactant used is typically preferably 5 parts by weight or less, possibly 4 parts by weight or less, 3 parts by weight or less, or even 2.5 parts by weight or less.

As the surfactant, commonly known anionic surfactants, nonionic surfactants, cationic surfactants and the like can be used. Typically an anionic or nonionic surfactant is preferable. A surfactant having a reactive functional group (in typical, a radically-polymerizable functional group) can also be used. Hereinafter a surfactant having a reactive functional group may be referred to as a reactive surfactant while a general surfactant free of a reactive functional group may be referred to as a non-reactive surfactant. For the surfactant, solely one species or a combination of two or more species can be used.

Examples of non-reactive anionic surfactants include alkyl sulfates such as lauryl sulfate and octadecyl sulfate; fatty acid salts; alkyl benzene sulfonates such as nonyl benzene sulfonate and dodecyl benzene sulfonate; naphthalene sulfonates such as dodecylnaphthalene sulfonate: alkyl diphenyl ether disulfonate such as dodecyl diphenyl ether disulfonate; polyoxyethylene alkyl ether sulfates such as polyoxyethylene octadecyl ether sulfate and polyoxyethylene lauryl ether sulfate; polyoxyethylene alkyl phenyl ether sulfates such as polyoxyethylene lauryl phenyl ether sulfate; polyoxyethylene styrenated phenyl ether sulfate; sulfosuccinates such as lauryl sulfosuccinate and polyoxyethylene lauryl sulfosuccinate: polyoxyethylene alkyl ether phosphates; and polyoxyethylene alkyl ether acetates. When the anionic surfactant is in a salt form, the salt can be, for instance, a metal salt (preferably a monovalent metal salt) such as a sodium salt, potassium salt, calcium salt and magnesium salt; ammonium salt: or amine salt.

Examples of non-reactive nonionic surfactants include polyoxyethylene alkyl ethers such as polyoxyethylene lauryl ether and polyoxyethylene stearyl ether; polyoxyethylene alkyl phenyl ethers such as polyoxyethylene octyl phenyl ether and polyoxyethylene nonyl phenyl ether; sorbitan fatty acid esters such as sorbitan monolaurate, sorbitan monostearate and polyoxyethylene sorbitan monolaurate; polyoxyethylene glyceryl ether fatty acid esters; and polyoxyethylene-polyoxypropylene block copolymers.

As the reactive surfactant, it is preferable to use a species having a polymerizable (in typical, radically-polymerizable) functional group. For instance, it is possible to use a reactive surfactant having a structure of an aforementioned anionic or nonionic surfactant with an introduced radically-polymerizable functional group. The type of radically-polymerizable functional group is not particularly limited. It can be, for instance, an alkenyl group, acryloyl group, methacryloyl group, vinyl group, vinyl ether group (vinyloxy group), allyl ether group (allyloxy group), etc. Specific examples of the alkenyl group include propenyl group and isopropenyl group ($CH_2$=$C(CH_3)$—). The concept of propenyl group referred to herein encompasses 1-propenyl group ($CH_3$—CH=CH—) and 2-propenyl group ($CH_2$=CH—$CH_2$- which may be called allyl group).

Examples of anionic reactive surfactants include polyoxyethylene (allyloxymethyl) alkyl ether sulfates (e.g. ammonium salts), polyoxyethylene nonyl propenyl phenyl ether sulfates (e.g. ammonium salts), alkyl allyl sulfosuccinates (e.g. sodium salts), methacryloxy polyoxypropylene sulfuric acid ester salts (e.g. sodium salts), and polyoxyalkylene alkenyl ether sulfates (e.g. an ammonium salt having an isopropenyl group as the terminal alkenyl group). When the anionic reactive surfactant is forming a salt, the salt can be, for instance, a metal salt such as sodium salt or a non-metal salt such as ammonium salt and amine salt.

An example of nonionic reactive surfactants is polyoxyethylene nonyl propenyl phenyl ether.

Commercially available reactive surfactants include trade names AQUALON HS-05, AQUALON HS-10, AQUALON HS-1025, AQUALON HS-20, AQUALON KH-10, AQUALON KH-1025, AQUALON KH-05, AQUALON BC-0515, AQUALON BC-10, AQUALON BC-1025, AQUALON BC-20, AQUALON BC-2020, AQUALON RN-20, AQUALON RN-30, AQUALON RN-50, AQUALON AR-10, AQUALON AR-20 AQUALON AR-1025 and AQUALON AR-2020 available from Dai-ichi Kogyo Seiyaku Co., Ltd.; trade names ADEKA REASOAP SE-10N and ADEKA REASOAP SR-1025 available from ADEKA Corporation; trade names LATEMULE PD-104, LATEMULE PD-420, LATEMULE PD-430 and LATEMULE PD-450 available from Kao Corporation; trade names ELEMINOL JS-20 and ELEMINOL RS-3000 available from Sanyo Chemical Industries. Ltd; and trade name ANTOX MS-60 available from Nippon Nyukazai Co., Ltd.

From the standpoint of the emulsification properties, etc., in an embodiment, an anionic reactive surfactant can be preferably used.

When using a nonionic reactive surfactant, more favorable results can be obtained when used in combination with other surfactant(s), for instance, an anionic reactive surfactant, anionic non-reactive surfactant, nonionic non-reactive surfactant, etc.

From the standpoint of increasing the water resistance, the surfactant used in the art disclosed herein preferably comprises a reactive surfactant. In other words, at least one of the surfactants used is preferably a reactive surfactant. By carrying out emulsion polymerization of the starting monomers in the presence of a reactive surfactant, the reactive surfactant may undergo a reaction to be incorporated in the acrylic polymer. Upon incorporation in the acrylic polymer, the surfactant in its free form will decrease in amount. This can increase the water resistance. Thus, when carrying out the polymerization, the use of reactive surfactant can be advantageous for combining polymerization stability and water resistance of the PSA layer obtained from the post-polymerization, acrylic polymer-containing PSA composition. From the standpoint of obtaining superior water resistance, the ratio of reactive surfactant in the total weight of surfactant used in the emulsion polymerization can be 50% by weight or higher, or more preferably 70% by weight or higher. For instance, it may be preferable to employ an embodiment using solely a reactive surfactant as the surfactant. The reactive surfactant incorporated in the acrylic polymer is unlikely to bleed out to the PSA layer surface because its movement is limited in the PSA layer. This may also preferably help increase the water resistance. It is noted that, in this Description, the concept of including a reactive surfactant encompasses including the reactive surfactant with its reactive functional group (e.g. radically-polymerizable functional group) in a reacted form. Of the reactive surfactant in the art disclosed herein, at least some molecules are typically incorporated in the acrylic polymer as described above when included in a water-dispersed PSA composition or a PSA layer.

The weight average molecular weight (Mw) of the acrylic polymer is not particularly limited. For instance, it can be in a range of $10 \times 10^4$ to $500 \times 10^4$. Herein the Mw of the acrylic polymer refers to a Mw of a toluene-soluble material (a sol component) of the acrylic polymer. The Mw of the acrylic polymer refers to the value based on standard polystyrene determined by GPC (gel permeation chromatography). From the standpoint of increasing the adhesive properties, the acrylic polymer may have a Mw of preferably $150 \times 10^4$ or smaller, or more preferably $100 \times 10^4$ or smaller. From the standpoint of the cohesion, etc., the acrylic polymer may have a Mw of preferably $20 \times 10^4$ or larger, or more preferably $30 \times 10^4$ or larger (e.g. $40 \times 10^4$ or larger).

(Tackifier Resin)

The water-dispersed PSA composition disclosed herein comprises a tackifier resin. By this, a PSA sheet having excellent adhesive properties (e.g. adhesive strength, repulsion resistance) is obtained.

The tackifier resin is a water-dispersed tackifier resin (also called tackifier resin emulsion). That is, the water-dispersed PSA composition disclosed herein comprises a tackifier resin as an emulsion of the tackifier resin dispersed in water. For instance, by mixing an aqueous emulsion of an acrylic polymer and an emulsion of the tackifier resin, a PSA composition can be easily prepared, comprising these components at a desirable ratio. A preferable tackifier resin emulsion is essentially free of at least aromatic hydrocarbon-based solvents (more preferably essentially free of aromatic hydrocarbon-based solvents and other organic solvents).

Examples of the tackifier resin include rosin-based tackifier resins (including rosin derivative tackifier resins), petroleum-based tackifier resins, terpene-based tackifier resins, phenolic tackifier resins and ketone-based tackifier resins. These can be used solely as one species or in a combination of two or more species.

Examples of the rosin-based tackifier resin include rosins such as gum rosin, wood rosin and tall oil rosin as well as stabilized rosins (e.g. stabilized rosins obtained by disproportionation or hydrogenation of the rosins), polymerized rosins (e.g. multimers, typically dimers, of the rosins) and modified rosins (e.g. unsaturated acid-modified rosins obtained by modification with an unsaturated acid such as maleic acid, fumaric acid or (meth)acrylic acid).

Examples of the rosin derivative tackifier resin include esterification products of the rosin-based resins (e.g. rosin esters such as stabilized rosin esters and polymerized rosin esters), phenol modification products of the rosin-based resins (phenol-modified rosins) and their esterification products (phenol-modified rosin esters).

Examples of the petroleum-based tackifier resin include aliphatic petroleum resins, aromatic petroleum resins, copolymeric petroleum resins, alicyclic petroleum resins and their hydrogenation products.

Examples of the terpene-based tackifier resin include α-pinene resins. ß-pinene resins, aromatic group-modified terpene-based resins, and terpene-phenolic resins.

Examples of the ketone-based tackifier resin include ketone-based resins resulting from condensation of ketones (e.g. aliphatic ketones such as methyl ethyl ketone, methyl isobutyl ketone, acetophenone, etc.; alicyclic ketones such as cyclohexanone, methyl cyclohexanone, etc.) with formaldehyde.

Examples of the tackifier resin that can be preferably used in the art disclosed herein include rosin-based tackifier resins and terpene-based tackifier resins. Preferable examples of rosin-based tackifier resins include stabilized rosin esters and polymerized rosin esters. Preferable examples of terpene-based tackifier resins include terpene-phenol-based resins.

Such a tackifier resin emulsion can be prepared, using a surfactant (emulsifier) as necessary. As the surfactant possibly used in preparation of the tackifier resin emulsion, one, two or more species can be suitably selected and used among the same kinds of surfactant usable in preparation of the acrylic polymer emulsion. In typical, an anionic surfactant or nonionic surfactant is preferably used. The surfactant used for preparing the tackifier resin emulsion can be the same as or different from the surfactant used for preparing the acrylic polymer emulsion. For instance, it is preferable to employ an embodiment using an anionic surfactant in each emulsion preparation, an embodiment using a nonionic surfactant in each emulsion preparation, an embodiment using an anionic surfactant in one and a nonionic surfactant in the other, etc. The amount of surfactant used is not particularly limited as long as the tackifier resin can be prepared as an emulsion. For instance, it can be about 0.2 part by weight or greater (preferably 0.5 part by weight or greater) and about 10 parts by weight or less (preferably 5 parts by weight or less) to 100 parts by weight of tackifier resin (non-volatiles).

The softening point (Ts) of the tackifier resin used is not particularly limited. From the standpoint of enhancing the cohesion, etc., the tackifier resin's Ts is, for instance, possibly 80° C. or higher, preferably 90° C. or higher, also possibly 100° C. or higher, 120° C. or higher, or even 130° C. or higher.

While no particular limitations are imposed, in some embodiments, the tackifier resin in the art disclosed herein may comprise a high-Ts tackifier resin having a Ts of 140° C. or higher. The high-Ts tackifier resin has a Ts of preferably 145° C. or higher, for instance, possibly 150° C. or higher, 155° C. or higher, 160° C. or higher, or even 165° C. or higher. The use of high-Ts tackifier resin can favorably combine adhesion and cohesion. The maximum Ts of the tackifier resin is not particularly limited. From the standpoint of the compatibility low-temperature properties, etc., it is usually suitably 200° C. or lower, preferably 180° C. or lower, or possibly 175° C. or lower.

The softening point of a tackifier resin as referred to herein is defined as a value measured based on the softening point test method (ring and ball method) specified in both JIS K5902 and JIS K2207. In particular, a sample is quickly melted at a lowest possible temperature, and with caution to avoid bubble formation, the melted sample is poured into a ring to the top, with the ring being placed on top of a flat metal plate. After cooled, any portion of the sample risen above the plane including the upper rim of the ring is sliced off with a small knife that has been somewhat heated. Following this, a support (ring support) is placed in a glass container (heating bath) having a diameter of 85 mm or larger and a height of 127 mm or larger, and glycerin is poured into this to a depth of 90 mm or deeper. Then, a steel ball (9.5 mm diameter, weighing 3.5 g) and the ring filled with the sample are immersed in the glycerin while preventing them from making contact. The temperature of glycerin is maintained at 20° C.±5° C. for 15 minutes. The steel ball is then placed at the center of the surface of the sample in the ring, and this is placed on a prescribed location of the support. While keeping the distance between the ring top and the glycerin surface at 50 mm, a thermometer is placed so that the center of the mercury ball of the thermometer is as high as the center of the ring, and the container is heated evenly by projecting a Bunsen burner flame at the midpoint between the center and the rim of the bottom of the container. After the temperature has reached 40° C. from the start of heating, the rate of the bath temperature rise must be kept at 5.0° C.±0.5° C. per minute. As the sample gradually softens, the temperature at which the sample flows out of the ring and finally touches the bottom plate is read as the softening point. Two or more measurements of softening point are performed at the same time, and their average value is used.

From the standpoint of obtaining preferable effects of the use, usually, the amount (based on non-volatiles) of tackifier resin used is, to 100 parts by weight of the acrylic polymer, suitably 1 part by weight or greater, preferably 3 parts by weight or greater (e.g. 5 parts by weight or greater), more preferably 12 parts by weight or greater, or yet more preferably 16 parts by weight or greater. According to the art disclosed herein, good water resistance can be obtained even in an embodiment comprising 22 parts or more (e.g. 25 parts or more) by weight of tackifier resin to 100 parts by weight of acrylic polymer. From the standpoint of the cohesive strength, etc., usually, the amount of tackifier resin used is, to 100 parts by weight of the acrylic polymer, suitably 90 parts by weight or less, preferably 70 parts by weight or less, more preferably 55 parts by weight or less, yet more preferably 50 parts by weight or less (e.g. 45 parts by weight or less, typically 40 parts by weight or less).

When the water-dispersed PSA composition disclosed herein comprises a high-Ts tackifier resin, from the standpoint of the cohesive strength, etc., the high-Ts tackifier resin can be used alone as the tackifier resin. From the standpoint of balancing with various other adhesive properties, in some embodiments, a high-Ts tackifier resin can be used in combination with a tackifier resin having a lower T (e.g. a tackifier resin with Ts≤120° C. or Ts≤110° C.). In such an embodiment, the ratio of high-Ts tackifier resin in the entire tackifier resin used can be, for instance, 20% by weight or higher, 40% by weight or higher, or even 60% by weight or higher. The ratio of high-Ts tackifier resin can be, for instance, 90% by weight or lower, 80% by weight or lower, or even 70% by weight or lower.

(Polyacrylic Acid)

The water-dispersed PSA composition disclosed herein comprises a polyacrylic acid. When a suitable amount of a polyacrylic acid having a suitable number average molecular weight is included in the water-dispersed acrylic PSA composition comprising a water-dispersed tackifier resin, the water resistance of the PSA layer formed from the water-dispersed PSA composition can be effectively improved. In other words, the polyacrylic acid of a prescribed number average molecular weight used in a prescribed amount relative to the base polymer can work as a water resistance enhancer.

The art disclosed herein uses, as the water resistance enhancer, a polyacrylic acid having a number average molecular weight (Mn) of 2000 or higher and $550 \times 10^4$ or lower. In a preferable embodiment, the polyacrylic acid can have a Mn of 3000 or higher and $500 \times 10^4$ or lower, or 5000 or higher and $500 \times 10^4$ or lower. With increasing Mn, the water resistance-enhancing effect tends to be more readily obtained. From such a standpoint, the polyacrylic acid's Mn is preferably $1 \times 10^4$ or higher (e.g. $5 \times 10^4$ or higher), more preferably $10 \times 10^4$ or higher or yet more preferably $15 \times 10^4$ or higher. On the other hand, when the polyacrylic acid has an excessively high Mn, addition of the polyacrylic acid may cause a drastic increase in viscosity of the water-dispersed PSA composition, likely leading to problems such as lower applicability (harder application) and making it difficult to have a polyacrylic acid content suited for water resistance enhancement. From such a standpoint, the polyacrylic acid-s Mn is preferably $400 \times 10^4$ or lower, more preferably $300 \times 10^4$ or lower, or yet more preferably $200 \times 10^4$ or lower. In an embodiment of the art disclosed herein, the polyacrylic acid's Mn can be $150 \times 10^4$ or lower, $100 \times 10^4$ or lower, or even $75 \times 10^4$ or lower.

As used herein, the number average molecular weight (Mn) refers to a value determined by GPC based on standard polyethylene glycols/polyethylene oxides.

In the art disclosed herein, a polyacrylic acid having an aforementioned Mn is used in an amount of 0.3 part by weight or greater and 7 parts by weight or less to 100 parts by weight of the base polymer. With increasing polyacrylic acid content at or above the lower limit, the water resistance-enhancing effect tends to be more readily obtained. From such a standpoint, the polyacrylic acid content per 100 parts by weight of base polymer is more preferably 0.4 part by weight or greater, or yet more preferably 0.5 part by weight or greater. In some embodiments, the polyacrylic acid content per 100 parts by weight of base polymer can be 1 part by weight or greater, or even 1.5 part by weight or greater. When the amount of the polyacrylic acid having a Mn suited for water resistance enhancement is higher than the upper limit, problems such as lower applicability are more likely to occur, possibly making it difficult to form a PSA layer having good surface conditions. From such a standpoint, the polyacrylic acid content per 100 parts by weight of base polymer is more preferably 6 parts by weight or less, or yet more preferably 5 parts by weight or less (e.g. 4.5 parts by weight or less). In an embodiment of the art disclosed herein, the polyacrylic acid content per 100 parts by weight of base polymer can be 4.25 parts by weight or less, or even 4 parts by weight or less.

(Crosslinking Agent)

The water-dispersed PSA composition used for forming the PSA layer preferably comprises a crosslinking agent as an optional component. The PSA layer in the art disclosed herein may comprise the crosslinking agent in a post-crosslinking-reaction form, in a pre-crosslinking-reaction form, in a partially crosslinked form, in an intermediate or combined form of these, etc. In typical, the crosslinking agent is included in the PSA layer mostly in the post-crosslinking-reaction form.

The type of crosslinking agent is not particularly limited. A suitable species can be selected and used among, for instance, isocyanate-based crosslinking agents, epoxy-based crosslinking agents, oxazoline-based crosslinking agents, aziridine-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents, hydrazine-based crosslinking agents and amine-based crosslinking agents. Either an oil-soluble crosslinking agent or a water-soluble crosslinking agent may be used here as the crosslinking agent. For the crosslinking agent, solely one species or a combination of two or more species can be used. The amount of the crosslinking agent used is not particularly limited. For instance, to 100 parts by weight of the acrylic polymer, it is suitably about 10 parts by weight or less (e.g. about 0.005 to 10 parts by weight) or preferably about 5 parts by weight or less (0.01 to 5 parts by weight).

(Other Additives)

From the standpoint of easy separation from release liner, the water-dispersed PSA composition disclosed herein preferably comprises a silicon compound (typically a silane coupling agent). For the silicon compound, one, two or more species can be used among alkylalkoxysilanes, vinyl group-containing silanes, epoxy group-containing silanes, styryl group-containing silanes, (meth)acryloyl group-containing silanes, amino group-containing silanes, ureido group-containing silanes, mercapto group-containing silanes, isocyanate group-containing silanes, silyl group-containing sulfides and the like. Among them alkylalkoxysilanes are preferable. The molecular weight of the silicon compound may be suitably about 100 or larger (e.g. 200 or larger). It can be about 500 or smaller (e.g. 350 or smaller).

As the alkylalkoxysilane, any of an alkyltrialkoxysilane, dialkyldialkoxysilane, trialkylmonoalkoxysilane, tetraalkoxysilane and phenylalkoxysilane can be used. The alkyl group can be either acyclic or cyclic. Specific examples of the alkylalkoxysilane include methyltrimethoxysilane, ethyltrimethoxysilane, n-propyltrimethoxysilane, n-butyltrimethoxysilane, isobutyltrimethoxysilane, n-hexyltrimethoxysilane, n-octyltrimethoxysilane, n-decyltrimethoxysilane, hexadecyltrimethoxysilane, methyltriethoxysilane, dimethoxydimethylsilane, diethoxydimethylsilane, cyclohexylmethyldimethoxysilane, methoxytrimethylsilane, octadecyldimethylmethoxysilane, phenyltrimethoxysilane, phenyltriethoxysilane, dimethoxydiphenylsilane, diphenylethoxymethylsilane, and dimethoxymethylphenylsilane. In particular, alkyltrialkoxysilanes are preferable.

From the standpoint of obtaining sufficient effects of its addition, the silicon compound content is preferably 0.005 part by weight or greater (e.g. 0.01 part by weight or greater, typically 0.03 part by weight or greater) relative to 100 parts by weight of the acrylic polymer. From the standpoint of the storage stability, the silicon compound content is preferably less than 1.0 part by weight (e.g. 0.5 part by weight or less, typically 0.3 part by weight or less) relative to 100 parts by weight of the acrylic polymer.

If necessary, the PSA composition disclosed herein may comprise an acid or base (ammonia water, etc.) used for such purposes as pH adjustment. Examples of other optional ingredients that may be added in the PSA composition disclosed herein include viscosity modifier, leveling agent, crosslinking-aiding agent, release modifier, plasticizer, softener, filler, colorant (pigment, dye, etc.), antistatic agent, anti-aging agent. UV-ray absorber, antioxidant and light stabilizer. With respect to these various additives, heretofore known species can be used by typical methods. Since these do not particularly characterize the present invention, further details are omitted.

<PSA Sheet>

(Examples of Configuration of PSA Sheet)

The PSA sheet disclosed herein has a PSA layer formed by using the water-dispersed PSA composition. It may be a PSA sheet having the PSA layer on one or each face of a substrate (base material), or a substrate-free PSA sheet in which the PSA layer is held on a release liner (which may also be thought as a substrate having a release face). The concept of a PSA sheet as used herein may encompass so-called PSA tape, PSA label and PSA film. The PSA layer is typically formed continuously, but is not limited to such a configuration. It may instead be formed in a regular or random pattern of dots, stripes, etc. The PSA sheet may be in a roll form or a flat sheet form. Alternatively, the PSA sheet may be in a form that has been fashioned into any of various other shapes.

The PSA sheet disclosed herein may be, for instance, in a form of an adhesively double-faced PSA sheet having a cross-sectional structure schematically illustrated in FIG. 1. Double-faced PSA sheet 1 comprises a substrate 15, and a first PSA layer 11 and a second PSA layer 12 supported by the two respective faces of substrate 15. More specifically, substrate 15 has a first face 15A and a second face 1513 (both non-releasable) provided with the first PSA layer 11 and second PSA layer 12, respectively. As shown in FIG. 1, double-faced PSA sheet 1 prior to use (before adhered to an adherend) may be in a form where it is layered with a release liner 21 having a front face 21A and a back face 21B both releasable and wound together in a roll. In double-faced PSA sheet 1 having such a form, the surface (second adhesive face 12A) of the second PSA layer 12 and the surface (first adhesive face 11A) of the first PSA layer 11 are protected with the front face 21A and back face 21B of release liner 21, respectively. Alternatively, it may be in a form where the first adhesive face 11A and second adhesive face 12A are protected with two separate release liners.

(Properties of PSA Sheet)

The adhesive strength of the PSA sheet disclosed herein (typically a double-faced PSA sheet) is not particularly limited. The PSA sheet according to a preferable embodiment may have a 180° peel strength (to-SUS peel strength) of 5 N/20 mm or greater when applied to a stainless steel plate and stored at 23° C. and 50% RH for 30 minutes. Hereinafter, the to-SUS peel strength after stored at 23° C. and 50% RH for 30 minutes may be referred to as the "initial peel strength S0." The PSA sheet exhibiting such a property is preferably used as a highly adhesive PSA sheet to firmly fasten articles and parts. The initial peel strength S0 is more preferably 6 N/20 mm or greater, yet more preferably 7 N/20 mm or greater (e.g. 8 N/20 mm or greater, or even 9 N/20 mm or greater). When the PSA sheet disclosed herein is a double-faced PSA sheet, it is preferable that each adhesive face exhibits such peel strength.

The art disclosed herein can bring about a PSA sheet with increased water resistance. The PSA sheet according to a preferable embodiment has a 180° peel strength (to-SUS peel strength) of, for instance, 4 N/20 mm or greater after applied to a stainless steel plate and stored at 60° C. and 95% RH (under wet-hot conditions) for 24 hours. Hereinafter, the to-SUS peel strength after stored under wet-hot conditions for 24 hours may be referred to as the "post-wet-heating peel strength Sw." The PSA sheet showing such a property can achieve highly reliable bonding even in a humid environment (typically in a hot and humid environment). Thus, it can be preferably used as a PSA sheet with high bonding reliability. For instance, it can be preferably used as a PSA sheet showing highly reliable adhesion even in an environment susceptible to an increase in humidity (e.g. in an environment that can be exposed to an atmosphere with changing humidity, etc.). The post-wet-heating peel strength Sw is preferably 5 N/20 mm or greater, or more preferably 6 N/20 mm or greater (e.g. 7 N/20 mm or greater, or even 7.5 N/20 mm or greater). When the PSA sheet disclosed herein is an adhesively double-faced PSA sheet, it is preferable that each adhesive face has such a peel strength value.

The peel strengths S0 and Sw are determined by the method described later in Examples.

In the PSA sheet disclosed herein, the ratio of post-wet-heating peel strength Sw to initial peel strength S0 is not particularly limited. The post-wet-heating peel strength Sw to initial peel strength S0 ratio (Sw/S0) can be, for instance, 0.25 or higher. In some embodiments, the Sw/S0 ratio (the peel strength retention rate under wet-hot conditions) is preferably 0.3 or higher, more preferably 0.35 or higher, yet more preferably 0.4 or higher, possibly 0.45 or higher, or even 0.5 or higher. The maximum Sw/S0 ratio value is not particularly limited.

The overall thickness of the PSA sheet disclosed herein is not particularly limited. The PSA sheet may have an overall thickness of, for instance, 1 mm or smaller (e.g. 500 μm or smaller). Herein, the overall thickness of the PSA sheet refers to the combined thickness of the substrate and the PSA layer. In a preferable embodiment, the overall thickness may be 300 μm or smaller (more preferably 200 μm or smaller). The lower limit of the PSA sheet overall thickness can be, for instance, 30 μm or larger, and is usually suitably 50 μm or larger, preferably 70 μm or larger, or more preferably 100 μm or larger (e.g. 120 μm or larger).

<PSA Layer>

The PSA layer in the art disclosed herein may be preferably formed by providing an aqueous PSA composition such as the one described above to a given surface followed by drying or curing. When providing (typically applying) the PSA composition, a conventional coater can be used, such as gravure roll coater, reverse roll coater, kiss roll coater, dip roll coater, bar coater, knife coater and spray coater. The thickness of the PSA layer is not particularly limited. It is usually suitably about 2 μm or greater, preferably about 5 μm or greater, more preferably 10 μm or greater, yet more preferably 20 μm or greater (typically 30 μm or greater. e.g. 50 μm or greater). The thickness of the PSA layer is usually suitably about 200 μm or less, or preferably about 120 μm or less (e.g. 100 μm or less, typically 80 μm or less).

<Substrate>

In the PSA sheet disclosed herein, the substrate that supports (backs) the PSA layer may be, for example, a plastic film such as a polyolefin (e.g. polyethylene, polypropylene, ethylene-propylene copolymer) film, a polyester (e.g., polyethylene terephthalate) film, a vinyl chloride resin film, a vinyl acetate resin film, a polyimide resin film, a polyamide resin film, a fluororesin film, or cellophane: a type of paper, such as Japanese paper, kraft paper, glassine, wood-free paper, synthetic paper or top-coated paper; a woven or nonwoven fabric composed of any of various types of fibrous substances, either singly or as a blend; a rubber sheet made of, e.g. natural rubber or butyl rubber: foam sheets made of foam such as expanded polyurethane or expanded polychloroprene rubber; a metal foil such as aluminum foil and copper foil; or a composite thereof. The plastic film may be of a non-stretched type or a stretched (monoaxially stretched or biaxially stretched) type. The substrate may be in the form of a single layer, or may be in the form of a laminate.

As the substrate according to a preferable embodiment, a nonwoven fabric substrate is used. For example, any species can be used among nonwoven fabrics formed of natural fibers such as wood pulp, cotton, and hemp (e.g. Manila hemp); nonwoven fabrics formed of chemical fibers (synthetic fibers) such as polyester fiber, rayon, vinylon, acetate fiber, polyvinyl alcohol (PVA) fiber, polyamide fiber, polyolefin fiber, and polyurethane fiber; nonwoven fabrics formed of two or more fiber species that are different material-wise; and the like. In particular, a nonwoven fabric substrate formed of hemp (e.g. Manila hemp) is preferable. In this case, the amount of hemp in the nonwoven fabric is preferably 90% by weight or greater, more preferably 95% by weight or greater. It is particularly preferable to use a nonwoven fabric essentially consisting of hemp.

When using a nonwoven fabric as the substrate, a nonwoven fabric having a grammage of about 10 g/m² or greater (e.g. 13 g/m² or greater), but about 25 g/m² or less (e.g. 22 g/m² or less) can preferably be used. The nonwoven fabric preferably has a bulk density (which can be calculated by dividing the grammage by the thickness) in a range of about 0.25 g/cm³ to 0.50 g/cm³. A nonwoven fabric having a tensile strength of 8 N/15 mm or greater in both the machine direction (MD) and the transverse direction (TD) is preferable. A nonwoven fabric with at least an MD tensile strength of 12 N/15 mm or more (e.g. 18 N/15 mm or greater, or even 24 N/15 mm or greater) is more preferable. A nonwoven fabric having a tensile strength of about 12 N/15 mm or greater (e.g. 16 N/15 mm or greater) in both MD and T) is even more preferable. A nonwoven fabric satisfying such a tensile strength is suitable for constituting a PSA sheet with excellent tensile strength.

At the stage of manufacturing the nonwoven fabric, a polymer such as viscose, starch and cationic polymer (e.g. polyamide, amine, epichlorohydrin) can be used for the purpose of increasing the strength (e.g. tensile strength) of the nonwoven fabric. Such a polymer (which can be thought of as a nonwoven fabric strengthening agent) can be added during the papermaking stage of the nonwoven fabric (stage of concentrating the fibers) or can be applied or integrated after the papermaking stage. A nonwoven fabric using such a strengthening agent is suitable for constructing a PSA sheet with excellent tensile strength. Therefore, the use of a nonwoven fabric formed with such a strengthening agent is particularly effective, for instance, in a double-faced PSA sheet used on recyclable parts.

The substrate may contain various additives as necessary, such as filler (e.g. inorganic filler, organic filler), anti-aging agent, antioxidant, ultraviolet absorber, antistatic agent, lubricant, plasticizer, and colorant (e.g. pigment, dye). A known or conventional surface treatment, such as corona discharge treatment, plasma treatment and primer coating, may be applied to the substrate surface (in particular, the surface on the side to which the PSA layer is provided). Such surface treatment may be, for example, treatment to increase the anchoring of the PSA layer to the substrate.

The thickness of the substrate can be suitably selected in accordance with the purpose. It is about 10 μm or greater, usually 20 μm or greater, or preferably 30 μm or greater (typically 40 μm or greater, e.g. 50 μm or greater). With increasing substrate thickness, the strength of the substrate and PSA sheet tends to increase, increasing the handling properties (ease of processing) during manufacturing or use. The thickness is about 800 μm or less, usually 450 μm or less, or preferably 300 μm or less (typically 150 μm or less, e.g. 100 μm or less). By limiting the substrate thickness, the conformability to structures (steps, etc.) on adherend surfaces tends to increase.

<Release Liner>

The release liner protecting and/or supporting the PSA layer is not particularly limited material-wise or construction-wise. A suitable release liner may be selected and used among known release liners. For example, a preferable release liner has at least one surface that has been subjected to release treatment (typically, a surface provided with a release layer made of a release agent). As the substrate constituting this type of release liner (i.e. the substrate to be subjected to release treatment), a suitable substrate can be selected and used among substrates similar to those listed above as the substrate constituting the PSA sheet (e.g. various types of plastic film, paper, fabric, rubber sheet, foam sheet, metal foil, and composites thereof). As the release agent forming the release layer, a known or conventional release agent (e.g. silicone-based, fluorine-based, and long-chain alkyl-type release agents) can be used. Alternatively, a low-adhesion substrate formed of a fluorine-based polymer (e.g. polytetrafluoroethylene, polychlorotrifluoroethylene, polyvinyl fluoride, polyvinylidene fluoride, tetrafluoroethylene-hexafluoropropylene copolymer, chlorofluoroethylene-vinylidene fluoride copolymer) or a low-polarity polymer (e.g. olefin resins such as polyethylene and polypropylene) may be used as the release liner without applying any particular release treatment to the substrate surface. Such a low-polarity substrate can also be used as the release liner after release treatment to the surface.

The thicknesses of the substrate and the release layer constituting the release liner are not particularly limited and may be suitably selected according to the intended purpose and other considerations. The overall thickness of the release liner (in a release liner having a release layer on the substrate surface, the overall thickness including the substrate and the release layer) is, for instance, preferably at least 15 μm (typically about 15 μm to 500 μm), or more preferably about 25 m to 500 μm.

<Method for Producing On-Substrate Double-Faced PSA Sheet>

In preparing an on-substrate double-faced PSA sheet, the method is not particularly limited for providing a PSA layer to the first or second face of the substrate. To each of the first and second faces, usually, either method can be preferably applied, selected from the following: (1) a transfer method where the water-dispersed PSA composition is provided (typically applied) to a release liner and dried to form a PSA layer on the release liner, and then the PSA layer is adhered and transferred (layered) onto the substrate; and (2) a direct method (direct-coating method) where the water-dispersed PSA composition is directly provided (typically applied) to the substrate and dried. For example, a double-faced PSA sheet can be produced by applying the transfer method to each face of the substrate (transfer/transfer method), or a double-faced PSA sheet can be produced by applying the transfer method to one face (typically the face provided with the first PSA layer) of the substrate and the direct method to the other side (transfer/direct method).

<Applications>

Even if exposed to a hot and humid environment after applied to an adherend, the PSA sheet disclosed herein may be likely to retain the adhesive strength (peel strength) to the adherend. With such properties, the PSA sheet disclosed herein can be preferably used in embodiments where it is applied to various products that can be used in an environment demanding water resistance or moisture resistance or to components of these products, for purposes such as fixing, bonding, shaping, decorating, protecting and supporting the products or components. In particular, it can be preferably used for fixing the products or components. Examples of the environment demanding water resistance or moisture resistance include an environment with greatly changing temperature and humidity (e.g. wet areas in houses, outdoor areas possibly exposed to rain and wind, etc.). Examples of the products include home appliances, OA equipment, vehicles (e.g. automobiles), household appliances (including furniture), and portable devices.

Examples of home appliances include televisions (CRT, liquid crystal, plasma, organic EL, etc.), DVD players and other AV devices, microwave ovens, rice cookers, washing machines, washer dryers, vacuum cleaners, refrigerators, freezers, hot water pots, air conditioners, dishwashers, air cleaners, lighting equipment, clocks, thermometers. PDA (personal digital assistance) and fixed telephone sets. Examples of the OA equipment include word processors, electronic dictionaries, desktop PCs, notebook PCs, CRT displays, liquid crystal displays, organic EL displays, printers, scanners, photocopiers, fax machines and multifunction systems having two or more functions among these. Examples of vehicles include automobiles and trains. Examples of household appliances (including furniture) include bathtubs, vanity units, toilets, cupboards, bookshelves, tables, dressers and glass windows. Examples of portable devices include portable electronic devices such as mobile phones, smartphones, tablet PCs, notebook PCs, various wearable devices, digital cameras, digital video recorders, acoustic equipment (portable music players. IC recorders, etc.), calculators (pocket calculators, etc.), portable gaming devices, electronic dictionaries, electronic organizers, electronic books, in-vehicle information equipment, portable radios, portable televisions, portable printers, portable scanners, and portable modems as well as mechanical wrist watches and pocket watches, flashlights, and hand-held mirrors.

Examples

Several working examples relating to the present invention are described below, but the present invention is not intended to be limited to these examples. In the description below, "parts" and "%" are based on weight unless otherwise specified.

The materials used in Examples shown below are as follows:

RS-A: reactive surfactant (product name AQUALON KH-1025 available from DKS Co., Ltd.)
RS-B: reactive surfactant (product name AQUALON AR-1025 available from DKS Co., Ltd.)
RS-C: reactive surfactant (product name LATEMUL PD-104 available from Kao Corporation)
RS-D: reactive surfactant (product name ELEMINOL JS-20 available from Sanyo Chemical Industries. Ltd.)
RS-E: reactive surfactant (product name ELEMINOL RS-3000 available from Sanyo Chemical Industries. Ltd.)
RS-F: reactive surfactant (product name ADEKA REASOAP SR-1025 available from ADEKA Corporation)
NRS-G: non-reactive surfactant (product name HITENOL LA-10 available from DKS Co., Ltd.)
TR-A: polymerized rosin ester (product name SUPER ESTER E-865NT available from Arakawa Chemical Industries, Ltd.; Ts 160° C.)
TR-B: terpene phenol (product name TAMANOL E-200NT available from Arakawa Chemical Industries. Ltd.: Ts 150° C.)
TR-C: polymerized rosin ester (product name KE-802 available from Arakawa Chemical Industries, Ltd.; Ts 170° C.)
TR-D: polymerized rosin ester (product name SUPER ESTER NS-100H available from Arakawa Chemical Industries, Ltd.; Ts 100° C.)

(Acrylic Polymer A)

To a reaction vessel equipped with a thermometer, stirrer, nitrogen inlet and reflux condenser, were added 0.2 part of surfactant (RS-A) and 67 parts of distilled water. While stirring, the reaction vessel was purged with nitrogen at room temperature (25° C.) for one hour. To this, was then added 0.10 part of polymerization initiator (product name VA-057 available from FUJIFILM Wako Pure Chemical Corporation) and the resulting mixture was heated to 60° C. To this, was added dropwise at 60° C. over 4 hours an emulsion of 85 parts of 2-ethylhexyl acrylate (2EHA), 13 parts of methyl acrylate (MA), 1.25 parts of acrylic acid (AA), 0.75 part of methacrylic acid (MAA), 0.025 part of t-dodecanethiol (chain transfer agent), 0.02 part of 3-methacryloxypropyltrimethoxysilane (product name KBM-503 available from Shin-Etsu Chemical Co., Ltd.) and 1.8 parts of surfactant (RS-A) in 33 parts of distilled water. The reaction mixture was further allowed to cure at 70° C. for one hour. To this, was then added 0.05 part of polymerization initiator (product name VA-057 available from FUJIFILM Wako Pure Chemical Corporation) and the resulting mixture was allowed to cure for two more hours. The reaction mixture was allowed to cool to room temperature and adjusted to pH 6 with 10% ammonia water as a pH1 adjuster to prepare acrylic polymer A.

(Acrylic Polymers B to G)

In place of surfactant RS-A used in the preparation of acrylic polymer A, were used the surfactants shown in Table 1, respectively. Otherwise, by the same method as the preparation of acrylic polymer A were prepared acrylic polymers B to G.

(Acrylic Polymer H)

In place of 85 parts of 2EHA, 13 parts pf MA, 1.25 parts of AA, 0.75 part of MAA, 0.025 part of t-dodecanethiol (chain transfer agent) and 0.02 part of 3-methacryloxypropyltrimethoxysilane (product name KBM-503 available from Shin-Etsu Chemical Co., Ltd.), were used 68 parts of n-butyl acrylate (BA), 29 parts of 2EHA, 3 parts of AA, 0.05 part of t-dodecanethiol (chain transfer agent) and 0.03 part of 3-methacryloxypropyltrimethoxysilane (product name KBM-503 available from Shin-Etsu Chemical Co., Ltd.). Otherwise, by the same method as the preparation of acrylic polymer A, was prepared acrylic polymer H.

Example 1

To 100 parts of non-volatiles of acrylic polymer A, were added 30 parts of tackifier resin (TR-A) and 2 parts of polyacrylic acid (PAA) having a number average molecular weight (Mn) of 5000. After the resulting mixture was neutralized with 10% ammonia water and the viscosity was adjusted, it was applied to a release liner to a dried thickness of 60 μm. This was transferred to each face of nonwoven fabric (product name SP-14K available from Daifuku Paper MFG. Co., Ltd.) to obtain a double-faced PSA sheet according to this Example.

Example 2 to Example 18

The species of acrylic polymer, the species of tackifier resin and their amounts added, and the PAA's Mn values and amounts added were as shown in Table 1, respectively. Otherwise, by the same procedure as Example 1, were obtained double-faced PSA sheets according to Example 2 to Example 18.

[Peel Strength to SUS]
(Initial Peel Strength S0)

The to-SUS peel strength of the PSA sheet of each Example was measured as follows: The release liner covering one face of the PSA sheet (double-faced PSA sheet) was removed and 25 µm thick polyethylene terephthalate (PET) film was adhered to back the PSA sheet. The backed PSA sheet was cut into 20 mm wide by 100 mm long in size to prepare a test piece. In an environment at 23° C. and 50% RH, the test piece was press-bonded with a 2 kg roller moved back and forth once to a stainless steel plate (SUS304BA plate) as the adherend. The resultant was stored in the environment at 23° C. and 50% RH for 30 minutes. Based on JIS Z0237, using a tensile tester, the 180° peel strength (N/20 mm) was measured at a tensile speed of 300 mm/min. Three measurements (i.e. N=3) were taken and their average value was used as the initial peel strength S0 of the PSA sheet. The results are shown in the corresponding column in Table 1. In measuring a single-faced PSA sheet, the film backing can be omitted.

(Post-Wet-Heating Peel Strength Sw)

In the same manner as the test piece application in the initial peel strength S0 measurement, was press-bonded a test piece to a stainless steel plate (SUS304BA plate). The resultant was stored under wet-hot conditions of 60° C. and 95% RH for 24 hours; was then placed in an environment at 23° C. and 50% RH: and within 10 minutes after the placement, was determined the 180° peel strength (N/20 mm) in the same manner as the initial peel strength S0 measurement. Three measurements were taken and their average value was recorded as the post-wet-heating peel strength Sw of the PSA sheet. The results are shown in the corresponding column in Table 1.

As shown in Table 1, the PSA sheets of Examples 1 to 16 using PSA compositions comprising at least 0.3 part up to 7 parts PAA of $2000 \leq Mn \leq 550 \times 10^4$ per 100 parts of acrylic polymer exhibited clearly higher post-wet-heating peel strength Sw values than the PSA sheets of Examples 17 and 18 in which at least the PAA's Mn or the PAA content was out of the range. In comparison with the PSA sheets of Examples 17 and 18, the PSA sheets of Examples 1 to 16 also showed high peel strength retention rates (Sw/S0) under wet-hot conditions. These results show that the PSA sheets of Examples 1 to 16 had excellent water resistance.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1 PSA sheet
11 first PSA layer
11A first adhesive fam
12 second PSA layer
12A second adhesive face
15 substrate (support)
21 release liner

The invention claimed is:

1. A water-dispersed pressure-sensitive adhesive composition comprising an acrylic polymer as a base polymer, a water-dispersed tackifier resin having a softening point of 130° C. or higher, a surfactant, and a polyacrylic acid, wherein
the polyacrylic acid has a number average molecular weight of 2000 to $15 \times 10^4$ or $25 \times 10^4$ to $550 \times 10^4$,
the water-dispersed tackifier resin content is 22 parts by weight or higher and 70 parts by weight or lower relative to 100 parts by weight of the base polymer,
the polyacrylic acid content is 1.2 part by weight or higher and 7 parts by weight or lower relative to 100 parts by weight of the base polymer, and

TABLE 1

| | | | Tackifier resin | | Polyacrylic acid | | Peel strength (N/20 mm) | |
|---|---|---|---|---|---|---|---|---|
| | Polymer | Surfactant | Resin | Amount (pt)* | Mn | Amount (pt)* | S0 (initial) | Sw (wet-heated) |
| Ex. 1 | A | RS-A | TR-A | 30 | 5000 | 2 | 18.4 | 12.5 |
| Ex. 2 | A | RS-A | TR-A | 30 | $500 \times 10^4$ | 2 | 16.3 | 12.3 |
| Ex. 3 | A | RS-A | TR-A | 30 | $25 \times 10^4$ | 2 | 16.9 | 17.6 |
| Ex. 4 | A | RS-A | TR-A | 30 | $25 \times 10^4$ | 0.5 | 18.0 | 4.7 |
| Ex. 5 | A | RS-A | TR-A | 30 | $25 \times 10^4$ | 5 | 17.2 | 18.3 |
| Ex. 6 | B | RS-B | TR-A | 30 | $25 \times 10^4$ | 2 | 15.0 | 11.5 |
| Ex. 7 | C | RS-C | TR-A | 30 | $25 \times 10^4$ | 2 | 17.0 | 14.3 |
| Ex. 8 | D | RS-D | TR-A | 30 | $25 \times 10^4$ | 2 | 12.0 | 15.6 |
| Ex. 9 | E | RS-E | TR-A | 30 | $25 \times 10^4$ | 2 | 17.2 | 11.9 |
| Ex. 10 | F | RS-F | TR-A | 30 | $25 \times 10^4$ | 2 | 15.7 | 12.2 |
| Ex. 11 | G | NRS-G | TR-A | 30 | $25 \times 10^4$ | 2 | 13.2 | 6.3 |
| Ex. 12 | H | RS-A | TR-B | 30 | $25 \times 10^4$ | 1.2 | 15.7 | 9.3 |
| Ex. 13 | H | RS-A | TR-B | 30 | $10 \times 10^4$ | 2 | 14.4 | 11.7 |
| Ex. 14 | A | RS-A | TR-C | 20 | $25 \times 10^4$ | 2 | 15.0 | 13.8 |
| | | | TR-D | 10 | | | | |
| Ex. 15 | A | RS-A | TR-C | 20 | $10 \times 10^4$ | 3 | 17.9 | 16.4 |
| | | | TR-D | 10 | | | | |
| Ex. 16 | A | RS-A | TR-A | 30 | 3000 | 2 | 18.2 | 10.8 |
| Ex. 17 | A | RS-A | TR-A | 30 | 100 | 2 | 18.2 | 1.5 |
| Ex. 18 | A | RS-A | TR-A | 30 | $25 \times 10^4$ | 0.1 | 17.0 | 0.8 |

*Amount relative to 100 parts of polymer the surfactant comprises a reactive surfactant having a radically-polymerizable functional group.

2. The water-dispersed pressure-sensitive adhesive composition according to claim 1, wherein the acrylic polymer is a polymerization product of a starting monomer mixture comprising more than 50% alkyl (meth) acrylate by weight.

3. A pressure-sensitive adhesive sheet comprising a pressure-sensitive adhesive layer formed from the water-dispersed pressure-sensitive adhesive composition according to claim 1.

4. The pressure-sensitive adhesive sheet according to claim 3, having a 180° peel strength of 4 N/20 mm or greater after applied to a stainless steel plate and stored at 60° C. and 95% RH for 24 hours.

5. The pressure-sensitive adhesive sheet according to claim 3, wherein its 180° peel strength after applied to a stainless steel plate and stored at 60° C. and 95% RH for 24 hours is at least 0.5 times its 180° peel strength after applied to a stainless steel plate and stored at 23° C. and 50% RH for 30 minutes.

6. The pressure-sensitive adhesive sheet according to claim 3, formed as an adhesively double-faced pressure-sensitive adhesive sheet comprising a substrate as well as first and second pressure-sensitive adhesive layers placed, respectively as the pressure-sensitive adhesive layer, on first and second faces of the substrate.

7. The pressure-sensitive adhesive sheet according to claim 6, wherein the substrate is a non-woven fabric.

* * * * *